May 12, 1942.　　R. C. ALLEN ET AL　　2,283,133
VEHICLE CONTROL SYSTEM
Filed Jan. 12, 1940　　5 Sheets-Sheet 1

Inventors
R. C. Allen
C. E. Kenney
by G. H. Dilsen
Attorney

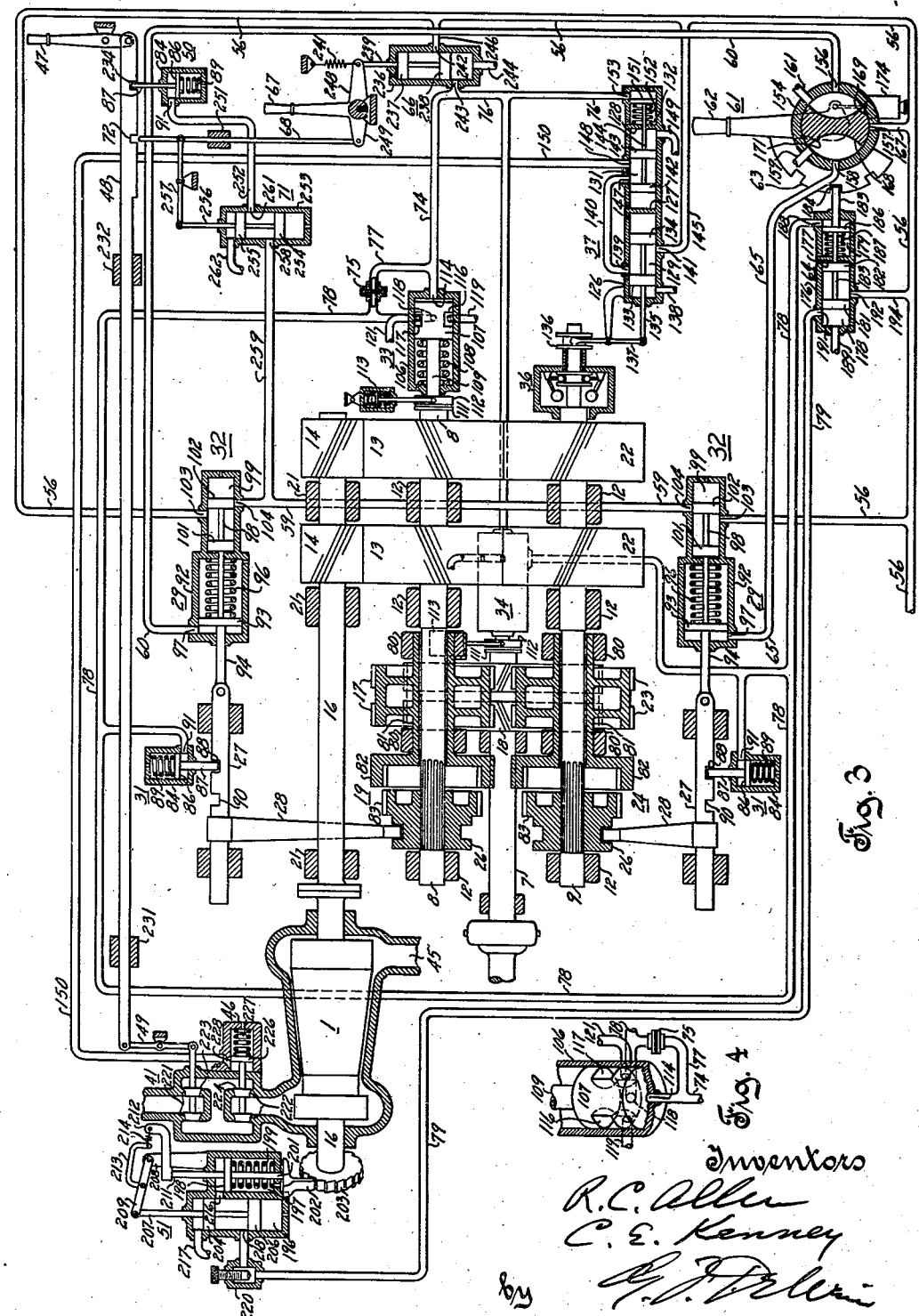

May 12, 1942.  R. C. ALLEN ET AL  2,283,133
VEHICLE CONTROL SYSTEM
Filed Jan. 12, 1940   5 Sheets-Sheet 3

Inventors
R. C. Allen
C. E. Kenney
G. J. Pellin
by
Attorney

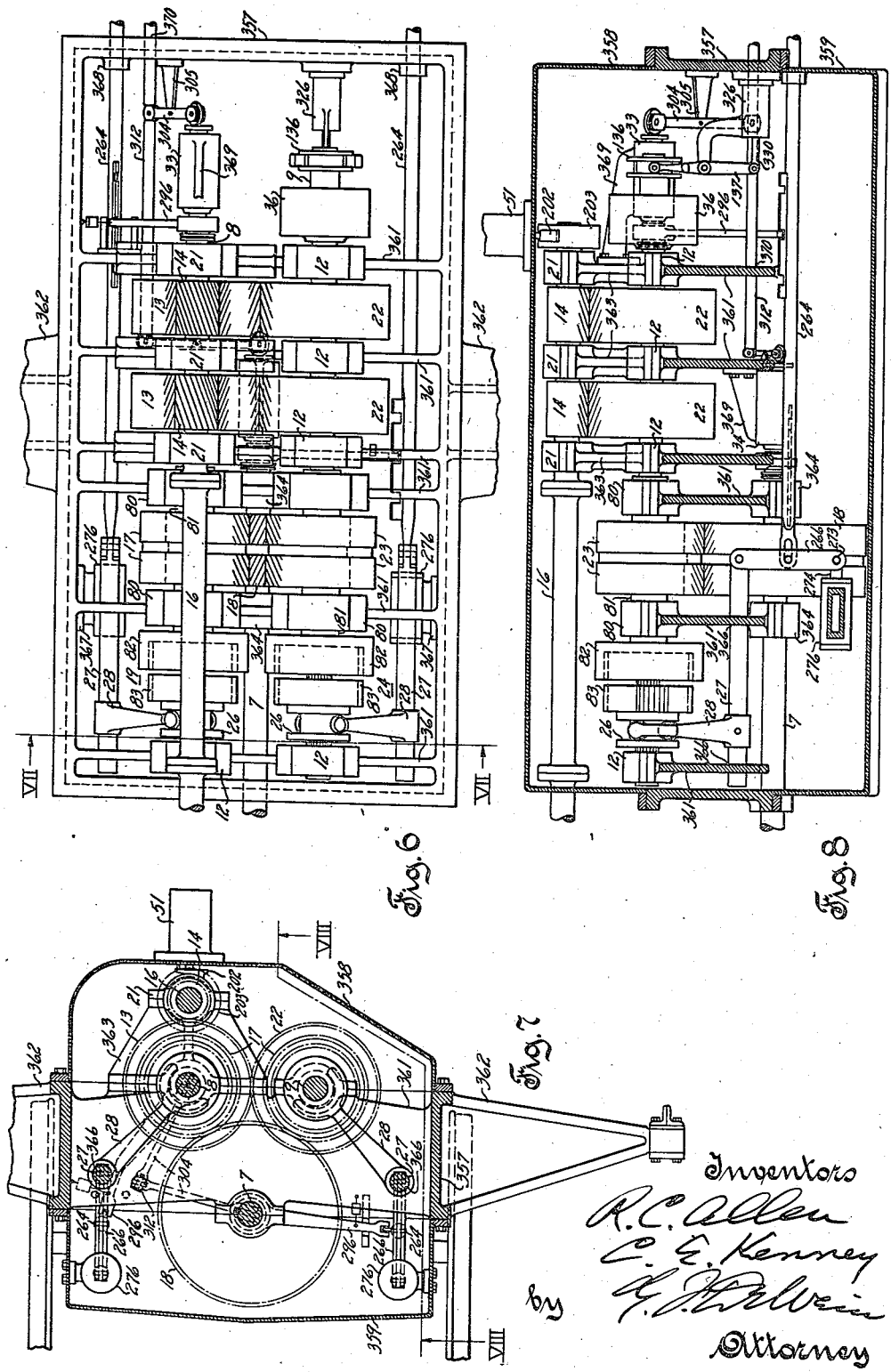

Patented May 12, 1942

2,283,133

UNITED STATES PATENT OFFICE 2,283,133

VEHICLE CONTROL SYSTEM

Robert C. Allen, Wauwatosa, and Clarence E. Kenney, West Allis, Wis., assignors to Allis-Chalmers Manufacturing Company, Milwaukee, Wis., a corporation of Delaware Application January 12, 1940, Serial No. 313,582

25 Claims. (Cl. 192—.01)

This invention relates generally to control systems for power driven vehicles and more particularly to control systems for mechanical drives in which one or more prime movers are mechanically connected with a drive shaft through reversible gearing including forward and reverse clutches for propelling the vehicle in either direction.

The primary object of this invention is to provide an improved control system which will positively prevent operation of the prime movers and an actuation of the clutch shifting means whenever the vehicle or any of the prime movers are in motion.

Another object of this invention is to provide an improved control system of this type operable to effect a slow operation of the prime movers or a portion of the gearing connected therewith to prevent interference between the teeth or jaws on the coacting clutch members and to facilitate disengagement of the coacting clutch members.

Another object of this invention is to provide an improved control system of this type operable to prevent operation of the prime movers which might possibly result from a leaky throttle valve at the time it is desired to actuate the clutch shifting means.

Still another object of this invention is to provide a means which is actuated and operable to stop the vehicle or drive shaft and/or the prime mover whenever a means controlling operation of the clutch shifting means is operated.

A further object of this invention is to provide an improved control system of this type which is applicable to a multiple prime mover drive to effect a slow rotation of a portion of the gearing disposed between each prime mover and the driving shaft actuated thereby and a sequential engagement of the clutches.

The invention accordingly consists of various features of construction, combinations of elements and arrangements of parts as more particularly pointed out in the accompanying claims and in the accompanying detailed description in which:

Fig. 3 is a more detailed illustration of the hydraulic control system shown in Fig. 1;

Fig. 4 is a partial perspective view of the clutch actuated valve employed in the hydraulic system with parts broken away to show the interior construction;

Fig. 6 is a plan view of a gear box with the top cover member and the jacking gear removed to show the arrangement of the gearing and the application of the control apparatus thereto;

Fig. 7 is a vertical section of the gear casing taken on line VII—VII of Fig. 6;

Fig. 8 is a vertical section through the gear casing taken on line VIII—VIII of Fig. 7.

Figures 1, 2:
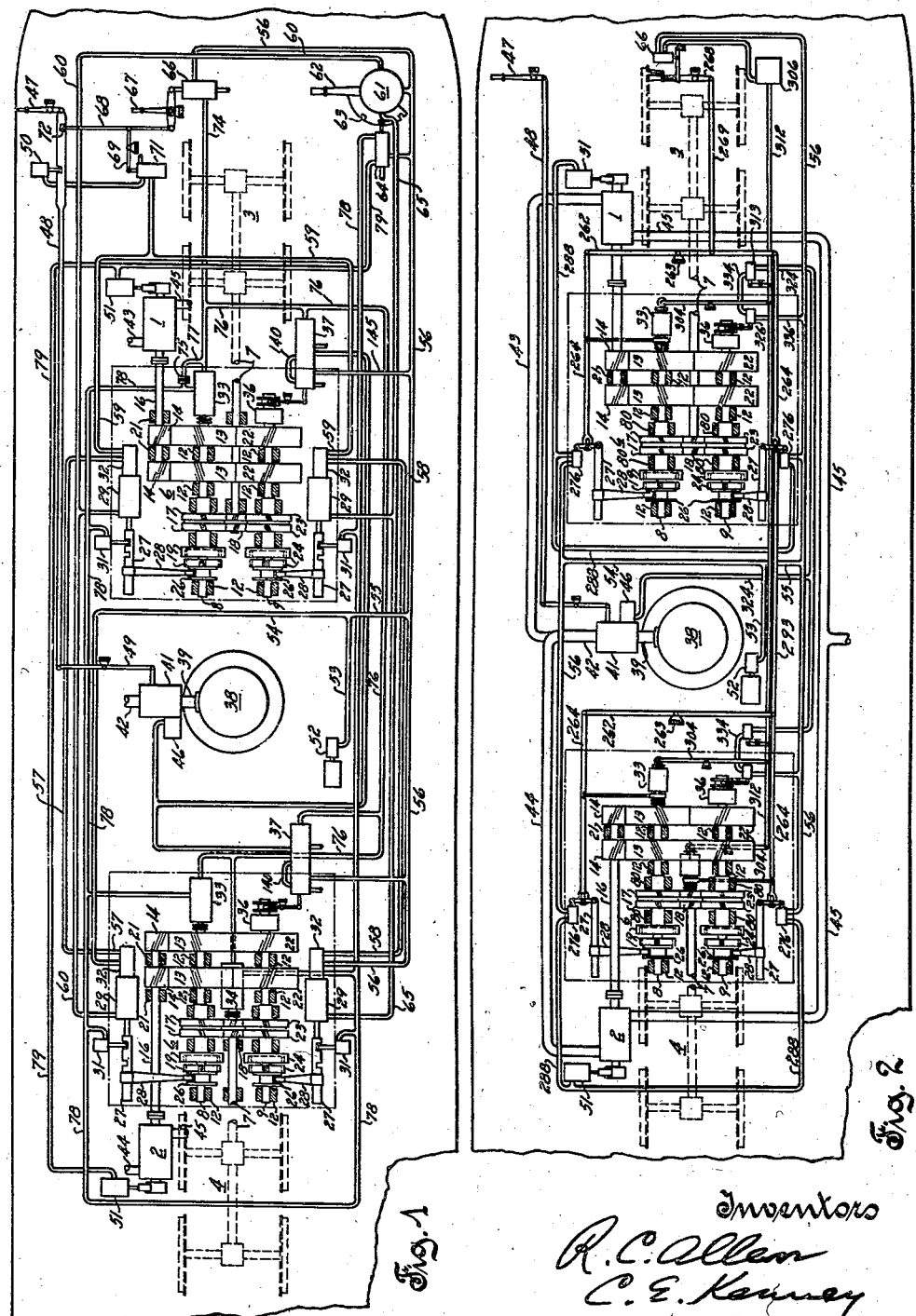
Fig. 1 is a schematic illustration of a locomotive drive embodying the invention.
Fig. 2 is a schematic illustration of a modified control system applied to the drive shown in Fig. 1.

Referring to the drawings, Fig. 1 shows a locomotive driven by two prime movers 1 and 2 which may be of any desired type and which are hereinafter referred to as turbines. Each of the turbines 1 and 2 is operatively connected with one or more driving axles or groups of driving axles 3 and 4, respectively, by a similar means comprising the gearing 6 and a drive shaft 7. The gearings 6 are of the double reduction reversing type and each comprises a pair of lay shafts 8 and 9 each of which is rotatably supported in a series of suitable bearings 12. The shaft 8 is provided with a pair of gears 13 which are constantly in mesh with a pair of pinions 14 secured to the turbine shaft 16, a second pair of gears 17 which are constantly in mesh with a pair of gears 18 secured to the driven or drive shaft 7 and a positive ahead clutch 19. The turbine shaft 16 is rotatably supported by a suitable series of bearings 21. The lay shaft 9 is provided with a pair of gears 22 which are constantly in mesh with the pair of gears 13 on the shaft 8, a second pair of gears 23 which are constantly in mesh with the gears 18 on the drive shaft 7, and a positive reverse clutch 24.

The positive clutches 19 and 24 are each provided with a shifting collar 26 and a clutch shifting bar 27 which includes a laterally extending arm 28 which arm is operatively connected with the collar 26. The clutch shifting bars 27 are each provided with a fluid actuated operator 29 and a fluid actuated locking device 31. 32 designates a control valve mechanism operatively connected with each of the operators 29. A combined braking and rotation responsive device 33 is arranged for operative connection with each of the lay shafts 8 thereby rendering said devices responsive to the rotation of the turbines 1 and 2. A similar device 34 is also arranged for operative connection with respect to one of the drive shafts 7 as shown in connection with turbine 2. A speed responsive device 36 is operatively associated with each of the lay shafts 9 and with each of the control valve mechanisms 37. Motive fluid for operating the prime movers 1 and 2 is delivered from a generator 38 through a pipe 39, a control valve casing 41, pipe 42 and the pipes 43 and 44, respectively, as best shown in Fig. 2. The motive fluid exhausts from the turbines through suitable conduits 45. A fluid actuated valve operator 46 is secured to the control valve casing 41 and a manually operated valve actuating mechanism comprising a hand lever 47, a slidably mounted rod 48 and a pivoted lever 49 is also operatively associated with the control valve casing 41. A fluid actuating locking device 50 is operatively associated with the slidably mounted rod 48. 51 designates a jacking gear mechanism operatively associated with each of the turbines 1 and 2 for effecting a slow rotation thereof.

52 designates a source of fluid under pressure which is directly connected with each of the control mechanisms 32 associated with the clutch shifting operators 29 for the turbine 2 by means of the pipe 53 and parallel connections comprising a pipe 54 and the pipes 55 and 56, respectively, and in this connection it should be noted that the control mechanisms 32 which are associated with the clutch operators 29 for the turbine 2 are connected in series flow relation with respect to the corresponding mechanisms associated with the turbine 1 by means of pipes 57 and 58, respectively, and that the valve mechanisms 32 associated with the turbine 1 are connected together by means of the pipe 59. Fluid under pressure is supplied to each of the fluid actuated operators 29 associated with the lay shafts 8 and 9 through the pipes 60 and 65, respectively, and the flow of fluid is controlled by the valve 61 which is actuated by means of a hand lever 62. A notched quadrant 63 and a fluid actuated locking device and control valve mechanism 64 are operatively associated with the quadrant 63. A main control valve 66 is actuated by means of a pivoted hand operated lever 67 which lever is operatively connected by means of a slidable link 68 and a pivoted lever 69 with a control valve 71. The link 68 coacts with a slot 72 in the sliding rod 48 to prevent a sliding movement of the rod when the hand lever 67 is moved in a clockwise direction from the position shown. The valve 66 which is connected with the source of fluid under pressure by means of pipes 56, 55 and 53 controls the admission of fluid under pressure to the pipes 74 and 76. Pipe 74 conducts the fluid to the combined braking and rotation responsive device 33 associated with turbine 1 and through the branch pipe 77 which includes a restriction 75, and pipe 78 to the fluid actuated locking devices 31, to the combined braking and rotation responsive device 34 associated with turbine 2, and to the combined locking device and control mechanism 64. Pipe 76 conducts the fluid to the speed responsive and control valve mechanisms 37 and to each of the combined braking and rotation responsive devices 33 and 34 associated with the turbine 2. The valve 64 controls the flow of the fluid through the pipe 79 to the jacking gear mechanism 51.

Referring more particularly to Fig. 3, it is seen that the lay shaft 8 is provided with a concentric sleeve 81 to which is secured the non-slidable member 82 of the positive clutch 19 and the pair of gears 17. The axially slidable member 83 of the clutch 19 is splined to the shaft 8 to permit an axial engaging and disengaging movement with respect to the non-slidable coacting clutch member 82. The lay shaft 9 is provided with an arrangement of gears and clutch members identical to that just described with respect to the lay shaft 8. The sleeve members 81 are supported for concentric rotation with respect to the shafts 8 and 9 by means of the bearings 80.

The locking members 31 for the clutch shifting bars 27 each comprises a cylinder 84 containing a piston 86 having a stem 87 extending through a wall of the cylinder and arranged to enter a slot 88 in the shifting bar 27 by the action of a spring 89 interposed between the piston and an end wall of the cylinder. The bars 27 are each provided with an additional slot 90 adapted to receive the stem 87 when the bar is in a different position. A fluid passage 91, to which is connected the pipe 78, is provided for admitting fluid under pressure to the underside of the piston head to withdraw the stem 87 from the slots 88 and 90. Each of the fluid actuated operators 29 comprises a cylinder 92 containing a piston 93 having a stem 94 extending through an end wall of the cylinder and pivotally connected with the clutch shifting bar 27 and a compression spring 96 interposed between the piston head and an end wall of the cylinder to urge the piston to the position shown in the drawings. A fluid passage 97 which is connected to the pipe 60 if the operator is associated with lay shaft 8 or to the pipe 65 if the operator is associated with the lay shaft 9, is provided in the side wall of the cylinder for admitting fluid under pressure beneath the piston in order to move the piston to the right against the action of the spring 96, providing, of course, that the locking stem 87 has been withdrawn from the slot 88. The piston 93 has a second stem 98 which extends through the other end wall of the cylinder 92 and into a valve chamber 99 which is formed by a portion of the casing defining the cylinder 92 and has attached thereto spaced piston portions 101 and 102 providing a balanced valve structure. A passage 103 is connected with the pipe 56 and an oppositely disposed passage 104 is connected with the pipe 59. The piston portion 102 coacts with passages 103 and 104 to control the flow of fluid through the chamber 99.

Each of the combined braking and rotation responsive devices 33 comprises a cylinder 106 in which is disposed a combined power piston and valve structure 107 biased to the position shown by means of the compression spring 108. The piston 107 is provided with a stem 109 extending through an end wall of the cylinder in axial alinement and in proximity with respect to the adjacent end of the lay shaft 8. The adjacent end of lay shaft 8 is provided with a braking surface 111 which also functions as a clutch face and the adjacent end of the piston stem 109 is enlarged to provide a similar surface 112. A biasing means 113 is connected with stem 109 and is operative to maintain the piston 107 in the position shown when the braking surfaces 111 and 112 are out of engagement and to permit a partial rotation of the piston 107 with respect to the cylinder 106 when the surfaces 111 and 112 are brought into engagement and the shaft 8 is rotating. The cylinder 106 is provided with a passage 114 which is connected with the pipe 74 for admitting fluid under pressure to the space between the cylinder and piston to move the piston 107 toward the shaft 8 and to forcibly engage the surface 112 with the surface 111. The piston 107, particular reference being also had to Fig. 4, is provided with two circumferentially extending and spaced grooves 116 and 117 and the side wall of the cylinder 106 is provided with a fluid inlet passage 118 and with drain connections 119 and 121 which are spaced apart with respect to each other and with respect to the passage 118. Pipe 78 is connected with the passage 118, and with the piston 107 in the position shown, the grooves 116 and 117 communicate with the drain connections 119 and 121, respectively, and the solid portion of the piston intermediate the said grooves is opposite the passage 118. The arrangement is such that when the piston is rotated in either direction from the position shown and to the extent permitted by the biasing means 113, the passage 118 and the pipe 78 are placed in communication with one of the drain connections 119, 121 by means of one of the grooves 116, 117. The combined braking and rotation responsive device designated 34 is constructed and is associated with the drive shaft 7 in the same manner as set forth in the foregoing description with respect to the devices 33 and the lay shafts 8.

The control valve mechanism 37 comprises a casing 126 having spaced partitions 127 and 128 dividing the interior of the casing into cylinders 129, 131 and 132. The cylinder 129 contains a pressure balanced piston type valve having spaced piston portions 133 and 134 and a stem 135 which is operatively connected with the axially movable collar 136 of the speed responsive device 36 by means of a pivoted lever 137. The side wall of the cylinder 129 is provided with with a drain connection 138 and with fluid passages 139 and 141 which are arranged so that when the valve is in the position shown the passages 139 and 141 are in communication and so that when the speed increases above a desired value the speed responsive device 36 moves the piston portions 133 and 134 towards the right and places the passage 139 in communication with the drain connection 138. The cylinder 131 contains a piston operated pressure balanced structure valve having axially spaced piston portions 142 and 143 and a stem 144 which extends through the partition 128 and into the cylinder 132. The side walls of the cylinder 131 are provided with fluid passages 147 and 148 and with a drain connection 149 and the arrangement is such that when the valve portions 142 and 143 are positioned as shown, passages 147 and 148 are in communication with one another and that when the valve is moved towards the left from the position shown the passage 148 is placed in communication with the drain connection 149. Passages 139 and 147 are connected by the pipe 140 and a pipe 145 connects passage 141 with the fluid supply pipe 56. A pipe 150 connects passage 148 with the overspeed valve operator 46. The end of the valve stem 144 which is disposed within the cylinder 132 is provided with a piston 151 and a compression spring 152 is disposed between the piston 151 and the partition 128. The side wall of the cylinder 132 is provided with a fluid passage 153 which is connected with the pipe 76 for the admission of fluid to the space between the end wall of the cylinder 132 and the piston 151.

The manually operated valve 61 comprises a cylinder 154 provided with circumferentially spaced fluid passages 156, 157, 158 and with spaced drain connections 159 and 161. The pipe 60 which is connected to passage 97 in the cylinder 92 of the operator 29 associated with the lay shaft 8 is also connected to the passage 156 in the valve cylinder 154 and the pipe 65 which is connected to the passage 97 in the cylinder 92 of the operator 29 associated with the lay shaft 9 is also connected to the passage 158 in the valve cylinder 154. Passage 157 in the valve cylinder 154 is connected to the fluid supply pipe 56 by means of the branch pipe 167. A plug member 168 has spaced cylindrical portions 169 and 171 which are in contact with cylinder 154 and which are so arranged that when the valve is in the position shown, the passages 156 and 158 are in communication with the drain passages 161 and 159, respectively, and that when the plug member is rotated through approximately thirty degrees in either direction from the position shown, one of the pipes 60, 65 is placed in communication with the pipe 167. The plug member 168 is provided with an actuating handle 62 and a notched quadrant 63. The handle 62 is operatively connected with a biasing means 174 which may be similar to the means 113 disclosed in connection with the combined braking and rotation responsive device 33 and which is operative to return the plug member and handle to the position shown.

The combined control valve and locking mechanism 64 comprises a casing 176 having a partition 177 therein defining a valve cylinder 178 and a piston cylinder 179. The valve cylinder contains a valve provided with axially spaced piston portions 181 and 182 and a stem 183 which extends through the partition 177 and piston cylinder 179 into engagement with a slot 184 in the quadrant 63. A portion of the stem 183 which is disposed within the cylinder 179 is provided with a piston member 186 and a compression spring 187 is disposed between the piston 186 and the partition 177 whereby the valve portions 181 and 182 and the piston 186 are urged to the position shown. The side wall of the casing defining the cylinder 179 is provided with a passage 188 which is connected with pipe 78 for admitting fluid under pressure to move the piston towards the left thereby compressing the spring 187 and withdrawing the stem 183 from the slot 184 in the quadrant 63. The side wall of the valve cylinder 178 is provided with a drain connection 189 and with fluid passages 191 and 192. When the valve portions 181 and 182 are in the position shown, the fluid passage 191 is in communication with the drain connection 189 and when the said portions are moved to the left from the position shown the passages 191 and 192 are placed in communication with each other. A pipe 194 connects passage 192 with the fluid supply pipe 56.

The jacking gear 51 comprises a casing defining a valve cylinder 196 and a power cylinder 197 in which is disposed a piston 198 biased to the position shown by means of a compression spring 199. A piston stem 201 extends downward from the piston and through the bottom wall of the cylinder and into engagement with a pawl 202 which is pivotally supported on the bottom portion of the casing and which is operatively associated with a ratchet wheel 203 mounted on the turbine shaft 16. A valve comprising axially spaced piston portions 204 and 206 disposed within the cylinder 196 is provided with an upward extending stem 207 which is pivotally connected with a fixed bracket 208 by means of a lever 209. The power piston 198 is also provided with an upward extending stem 211 having a laterally extending portion 212 which is pivotally connected with the lever 209 by means of a U-shaped link 213 and a spring 214. A passage 216 provides communication between the cylinders 196 and 197 and the side wall of cylinder 196 is provided at its upper end with a drain connection 217 and at an intermediate portion with a fluid inlet passage 218. The fluid supply pipe 79 which includes a regulating valve 220 is connected with passage 218. The arrangement is such that when the valve portions 204 and 206 are in the position shown and fluid under pressure is supplied through the passage 218, the fluid enters the top portion of the cylinder 197 through the passage 216 and urges piston 198 downward against the action of spring 199 which by means of the pawl 202 effects a partial rotation of the turbine shaft 16. When the piston 198 has moved downward a predetermined distance, the spring 214 functions to suddenly move the valve portions 204, 206 downward thereby placing the interior of the cylinder 197 in communication with the drain connection 217 which permits spring 199 to return the power piston 198 to the position shown. This operation continues as long as fluid under pressure is supplied through the pipe 79 and effects a slow, step-by-step rotation of the turbine shaft 16.

The interior of the valve casing 41 is provided with means forming valve seats 221 and 222 arranged in series flow relation and a throttle valve 223 and an overspeed valve 224 are arranged to coact with the valve seats 221 and 222, respectively. The stem of the overspeed valve 224 is provided with a piston 226 disposed in the cylinder 46 attached to the valve casing 41. A compression spring 227 which is disposed between the piston 226 and the outer wall of the cylinder 46 urges the valve 224 to its closed position as shown. The side wall of the cylinder 46 is provided with a fluid inlet passage 228 which connects with the pipe 150 for admitting fluid under pressure to the cylinder 46. The admission of fluid under pressure to the cylinder 46 moves the piston 226 against the action of the spring 227 and the valve 224 to its fully open position. The position of the throttle valve 223 is controlled by the manually operated lever arrangement comprising hand lever 47, the slide rod 48 which is supported in suitable guides 231 and 232, and the pivoted lever 49. Movement of the hand lever 47 to the right from the position shown operates the lever 49 to open the throttle valve. The slide rod 48, adjacent its point of connection to the hand lever 47, is provided with an additional notch 234 which is adapted to cooperate with the locking mechanism 50.

The main control valve 66 comprises a cylinder 236 having disposed therein, a valve means consisting of spaced piston portions 237 and 238 and a stem 239 extending upward through the top of the cylinder and connected with a biasing spring 241 which tends to hold the valve portions 237 and 238 in the position shown. The side wall of the cylinder 236 is provided with fluid inlet and discharge passages 242 and 243, respectively, and the bottom wall is provided with a drain connection 244 which communicates with the discharge passage 243 when the valve is in the position shown. The arrangement is such that when the valve is moved downward from the position shown against the action of the spring 241 a sufficient distance, the fluid inlet and discharge passages 242 and 243 are placed in communication. A pipe 246 connects the fluid supply pipe 56 with the passage 242 and the passage 243 is connected to the pipe 76. The valve is operated by means of a pivoted hand operated bell crank lever 67 having an arm 248 pivotally connected with the valve stem 239 and a second arm 249 pivotally connected with the rod 68 which is slidably mounted in a guide 251 and which is arranged to coact with the slot 72 in the slide rod 48. Movement of the hand lever 67 in a direction to permit the flow of fluid through passage 242, cylinder 236 and passage 243 moves the upper end of the rod 68 into the slot 72 in the slide rod 48.

The fluid actuated locking device 50 which coacts with the slot 234 in the slide rod 48 is identical to the locking devices 31 described in connection with the clutch shifting bars 27 and like numerals are used to designate the various parts. The inlet passage 91 is connected with a pipe 252 and flow of fluid through the pipe 252 is controlled by the valve 71 which comprises a cylinder 253 having disposed therein a valve provided with spaced piston portions 254 and 255 and a stem 256 extending upward through the cylinder 253. The stem 256 is operatively connected with the rod 68 by a pivoted lever 257. The side wall of the cylinder 253 is provided with a fluid inlet passage 258 which is connected with the fluid supply pipe 56 by means including the pipe 259, pipe 59 and the control valve mechanisms 32 associated with the operators 29, and with a fluid discharge passage 261 which is connected with the pipe 252. The valve portions 254 and 255 are so arranged that when the valve is in the position shown fluid may pass through the cylinder 253 and through pipe 252 into the cylinder 84 of the locking device 50. The upper portion of the cylinder 253 is provided with a drain connection 262 which is so arranged with respect to the fluid inlet passage 258 that when the valve portion 255 is moved downward a sufficient distance the fluid passage 261 and the drain connection 262 are placed in communication.

The system hereinabove described operates to control the clutch shifting mechanism, the overspeed control valve and the throttle valve in the following manner. Assuming that the parts are in the position shown in Fig. 3 and it is desired to drive the locomotive in the ahead direction which is effected by coupling the turbine shafts 16 with the driven shafts 7 by means of the lay shafts 8, the procedure is as follows. Hand lever 67 is moved to the right from the position shown which places the inlet and discharge passages of the valve 66 in communication with one another and with the pipe 56 which permits fluid under pressure to flow into the pipes 74 and 76 and to the inlet passage 114 of each of the combined braking and rotation responsive devices 33 and 34 and through branch pipe 77 and the pipe 78, to the locking devices 31, to the inlet passage 118 of each of the combined braking and rotation responsive devices 33 and 34, and to the inlet passage 188 in cylinder 179 of the locking device and valve mechanism 64. The restricted orifice 75 in branch pipe 77 functions, in the event the pipe 78 is connected to drain, to maintain sufficient pressure in pipes 74 and 76 to hold the coacting surfaces 111 and 112 in braking engagement and to actuate the piston 151 in the device 37.

The admission of fluid through the pipes 74, 76 to the devices 33, 34 operates the piston 107 to move the combined braking and clutch surfaces 112 into engagement with the similar cooperating surfaces 111 on the adjacent ends of the shafts 7 and 8. The fluid pressure in pipe 76 also actuates piston 151 which moves the valve portions 142, 143 of the device 37 to the left from the position shown in Fig. 3 and places pipe 150 and the cylinder 46 in communication with the drain connection 149 and as a result, spring 227 moves the piston 226 and closes the overspeed valve 224. The closure of valve 224 prevents the flow of fluid to the turbine in the event the throttle valve fails to fully close or in any other manner permits the passage of some operating fluid.

If any one of the shafts 7, and 8 is rotating, a piston 107 will be turned a sufficient distance to place the inlet passage 116 in communication with one of the drain connections 119, 121 and since the restricted orifice 75 retards the flow of fluid through the pipe 77 pressure will not build up in the pipe 78. Consequently, the locking devices 31 will not be retracted with respect to the slide bars 27, the locking device 64 will not be retracted with respect to the quadrant 63, and the valve portions 181 and 182 of the locking device 64 will remain in the position shown. The said movement of the hand lever 67 in addition to actuating valve 66 also moves the rod 68 into engagement with the slot 72 in the slide bar 46 and, through the medium of the rod 68 and lever 257, the valve 71 downward from the position shown which places the connection 261 of cylinder 253 in communication with the drain connection 262 and permits the spring 89 of locking device 80 to move the piston 86 to the position shown with its stem 87 extending into the slot 234 in the slide rod 48. Consequently, the throttle lever 47 and the reversing valve handle 62 are locked against movement and the combined braking and rotation responsive devices 33, 34 have functioned to stop the rotation of the turbines and/or the movement of the locomotive. The next step in the procedure, assuming that one of the turbines and/or the locomotive was in motion at the time the hand lever 67 was moved to the right, is to effect a return of the pistons 107 of the devices 33, 34 and the piston 151 of the device 37 to the positions shown in Fig. 3. This is accomplished by releasing the lever 67 which permits the spring 241 to return the valve 66 to the position shown and places pipes 74, 76 in communication with the drain connection 244, which in turn permits the springs 108 and the biasing means 113 to return the pistons 107 of the devices 33, 34 to the position shown in Fig. 3. The piston 151 of the device 37 is returned to the position shown in Fig. 3 by means of the spring 152.

When the turbines and locomotive are at rest, which may have been effected by the operation of the braking mechanisms as previously described, the admission of fluid under pressure to the pipes 74, 76, which is accomplished by moving the hand lever 67 to the right, and the resultant engagement of the coacting braking and clutch surfaces 111 and 112 does not effect a partial rotation of the pistons 107. Consequently, the pipe 78 is not placed in communication with the drain connections 119, 121 and the fluid within the pipe 78 and the branches connected therewith is under sufficient pressure to actuate the locking devices 31 and 64 to release the clutch shifting bars 27 and the handle 62 of the reversing valve 61, respectively. The shifting of the clutch member 83 on the lay shaft 8 is effected by moving the handle 62 to the right from the position shown which places the passages 157 and 158 of the reversing valve 61 in communication with one another which permits fluid under pressure to flow through the pipe 60 into the cylinder 92 of the operator 29 for engaging the ahead clutch 19. The power piston 93 and the valve portions 101, 102, which are connected therewith, are thereby moved to the right from the position shown which in turn moves the clutch shifting bar 27 in a direction tending to engage the movable clutch member 83 with the stationary clutch member 82, which engagement is actually effected providing the jaws or teeth on the movable clutch member 83 are disposed in alinement with respect to the grooves or slots in the stationary clutch member 82, and places the passages 103, 104 in the cylinder 99 in communication with one another thereby permitting fluid under pressure to pass through the pipes 59 and 259 and into the cylinder 253 of valve 71. However, since the valve 71 has been moved downward by the actuation of hand lever 67 as previously described, no fluid enters the pipe 252 and the locking device 50. Movement of the piston 151 of the device 37 effects a closure of the overspeed valve 224 in the manner and for the purpose previously described. The releasing movement of the piston 186 of locking device 64, which device is associated with the reversing valve 61, also actuates the valve portions 181 and 182 and places the passages 191, 192 in communication with one another which permits fluid under pressure to flow through the pipe 79, regulating valve 220 and passage 218 into the valve cylinder 196 of the jacking gear 51 whereby the jacking gear effects a slow step-by-step rotation of the turbine shaft 16 and of the axially movable clutch member 83. This slow rotation of the clutch member 83 will bring the jaws or teeth thereon into alinement with the coacting slots in the stationary member 82, if such relation did not exist at the time the operator 29 was actuated to effect a clutch engaging movement, which will permit the operator to slide the movable member 83 into engagement with the stationary member 82. The jacking gear 51 does not have sufficient power to turn the turbine shaft 16 when the said clutch members are engaged.

The gearing 6 is now conditioned for operating the locomotive in the forward direction and all that remains to be done in order to effect an actual movement of the locomotive is to release the hand operated lever 67 which effects a return of the valves 66 and 71 and the rod 68 to the positions shown in Fig. 3. The return of the valve 66 to the position shown places pipes 74, 76 and 78 in communication with the drain connection 244 which permits the springs 89 in the cylinders 84 of the locking devices 31 to move the piston stems 87 into the oppositely disposed slot in the clutch shifting bars 27, the spring 187 in the cylinder 179 of the locking device 64 to move the piston stem 183 into the oppositely disposed slot in the quadrant 63, and the return of piston 151 in the device 37 to the position shown. The shifting bars 27 and the reversing valve 61 are now locked against further movement. The valve stem 183 also returns the valve portions 181, 182 to the position shown which places pipe 79 and the jacking gear cylinders in communication with the drain connection 189. The return of piston 151 moves the valve portions 142, 143 to the position shown which admits fluid under pressure through pipe 145, cylinder 129, pipe 140, cylinder 131 and pipe 150 into the overspeed valve cylinder 46 to hold the valve 224 in its fully open position. The return of valve 71 to the position shown, since the fluid pressure in pipe 60 maintains piston 93 in the clutch engaging position which in turn holds the valve portion 102 in the position placing passages 103 and 104 in communication with one another, places the interior of the cylinder 84 of the locking device 50 in communication with the fluid supply pipe 56 by means of pipe 252, valve cylinder 253, pipe 259, pipe 59, and valve cylinder 99. The admission of fluid under pressure to the cylinder 84 of locking device 50 moves the piston 86 to retract the stem 87 from the slot 234 in the throttle slide rod 48 which permits the throttle lever 47 to be moved to open the throttle valve 223. The procedure necessary to condition this system to drive the locomotive in the reverse direction is similar to that just described in that the only difference resides in moving the lever 62 to the left instead of to the right from the neutral position shown which admits fluid under pressure to the operators associated with the lay shafts 9 instead of to the operators associated with the lay shafts 8.

The opening of the throttle valve 223 will now admit working fluid to the turbines 1 and 2 and the locomotive will be driven in the forward direction. The speed and power of the locomotive may be varied from zero to the maximum operating values merely by manipulating the throttle lever 47. The hand lever 67 will be held in the position shown by means of the spring 241 and the reversing valve lever 62 will remain locked in the ahead position until it is desired to drive the locomotive in the reverse direction. The valve portions 133 and 134 of the control mechanism 37 are always in the position shown during normal operation and when the locomotive and the turbines are at rest, but in the event the turbines should overspeed the governors 36 will actuate the valve portions 133 and 134 to place the pipe 140, pipe 150 and cylinder 46 in communication with the drain connection 138 thereby permitting the overspeed valve 224 to close.

When the locomotive is moving ahead and it is desired to drive the locomotive in the reverse direction the first step is to close the throttle valve 223 and bring the locomotive and the turbines to a complete stop as any attempt to actuate the locking devices 64 and 31 associated with the reversing valve 61 and the clutch shifting bars 27, respectively, necessitates moving the lever 67 to the right which brings the devices 33, 34 into operative engagement with the shafts 8 and 7, respectively, and if any one of the turbines and/or the locomotive is in motion, the pipe 78 is placed in communication with one of the drain connections 119 and 121. Consequently, there will not be sufficient pressure in the pipe 78 to withdraw the piston stems 87 and 183 from the oppositely disposed slots in the shifting bars 27 and in the quadrant 63, respectively. When the locomotive and the turbines have come to a complete stop, a movement of the lever 67 to the right will effect a release of the locking devices 31 and 64 as previously described. The lever 62 may then be moved through the neutral position shown and to the left which places pipe 60 in communication with the drain connection 161 and pipe 65 in communication with the source of fluid under pressure by means of pipes 167 and 56. Consequently, the movable clutch members 83 on the lay shafts 8 are disengaged from the cooperating stationary clutch members 82 by the movement of the pistons 93 which is effected by the springs 96 and the movable clutch members 83 on the lay shafts 9 are moved into engagement with the coacting stationary clutch members 82 by the fluid under pressure in the pipe 65. From this point on the operation of the various devices and the additional steps required to effect an actual operation of the locomotive in the reverse direction are identical to those set forth with respect to the operation of the locomotive in the forward direction and a further explanation in this connection is deemed unnecessary for a complete understanding of the invention.

It should be obvious from the foregoing description that the system is operable to prevent a clutch engaging or disengaging movement whenever any one of the turbines and/or the locomotive are in motion, that the first step in conditioning the locomotive for movement in either direction effects the closure of a valve arranged in series flow relation with respect to the throttle valve in order to prevent the turbines from being operated by the working fluid leaking past the throttle valve, and that the throttle valve is effectively locked in closed position until the turbine and drive shafts are actually coupled together to effect a movement of the locomotive in the selected direction. It should also be obvious that the automatic operation of the jacking gear in connection with the operation of the clutch shifting mechanism permits the ready engagement of the coacting axially movable and stationary clutch members and that the positive operation of the combined braking and rotation responsive devices quickly brings the turbines and the locomotive to a complete stop which materially reduces the time necessary to effect a reversal of the locomotive and prevents the possibility of damaging the gearing and clutch mechanism which might result if any one of the turbines and/or the locomotive is in motion.

Figure 5:
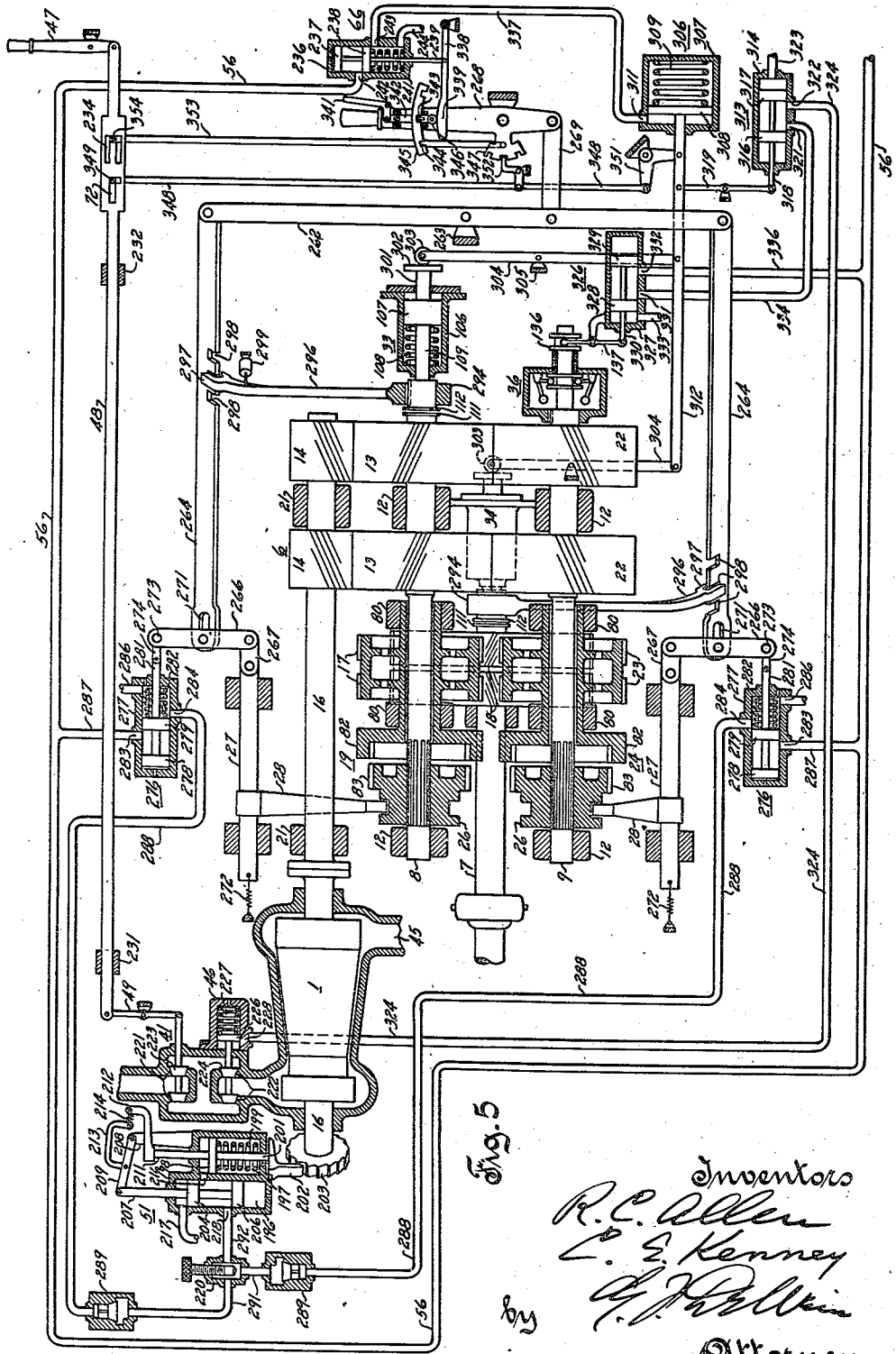
Fig. 5 is a more detailed illustration of the mechanical control system shown in Fig. 2.

The modified control system illustrated in Figs. 2 and 5 is somewhat similar to that illustrated and described in connection with Figs. 1 and 3 and in order to simplify the disclosure, like numerals are used to designate similar parts. The construction and arrangement of the gearings 6 including the forward and reverse clutches 19 and 24, respectively, of the throttle and overspeed valves 223 and 224, respectively, of the jacking gears 51, and of the governors 36 is identical to that shown in Figs. 1 and 3 and a further description with respect to these features is deemed unnecessary for a complete understanding of the invention. This modification differs from the system previously described in that the clutch shifting bars 27 are manually actuated, the combined braking and rotation responsive devices 33, 34 are actuated by a single power operator, the interlocking devices are purely mechanical, and in that the operation of the jacking gear for each turbine unit is effected only in the event there is actual interference between the jaws or teeth on the coacting clutch members associated with that particular unit.

Referring more particularly to Fig. 5, it is seen that the shifting bars 27 for actuating the forward and reverse clutches 19 and 24, respectively, are mechanically connected to the opposite ends of a lever 262, which is mounted on a fixed pivot 263, by means of links 264, levers 266 and links 267 and that lever 262 is moved about its fixed pivot point 263 by means of the hand lever 268 and the interconnecting link 269. The links 264 are connected with levers 266 by means of a pin and slot lost motion connection 271 and the arrangement is such that when the hand lever 268 is moved to the right from the position shown, a clutch engaging movement is imparted only to the bar 27 which is associated with the ahead clutch 19 and that due to the lost motion connection 271 no movement is imparted to the bar 27 which is associated with the reverse clutch 24. Obviously, if the hand lever 268 is moved to the left instead of to the right, a clutch engaging movement will be imparted only to the bar 27 which is associated with the reverse clutch 24. The clutch shifting bars 27 are biased to the position shown by means of springs 272.

The levers 266 are each provided with a movable fulcrum 273 comprising a link 274, and a pressure balanced piston type valve structure 276 having a cylinder 277, spaced piston portions 278 and 279, a stem 281 which is connected to the link 274 and a spring 282 interposed between an end wall of the cylinder and the piston portion 279 and operable under normal conditions to maintain the fulcrum 273 of lever 266 in the position shown. The cylinder 277 is provided with fluid passages 283 and 284 and with a drain connection 286 and the arrangement is such that when the piston portions 278 and 279 are in the position shown, passage 284 communicates with the drain connection 286 and that when the valve is moved to the right a sufficient distance passage 283 is placed in communication with passage 284. The fluid supply pipe 56 is connected with passage 283 by means of the pipe 287 and passage 284 is connected with the cylinder 196 of the jacking gear 51 by means of pipe 288, check valve 289, pipe 291, regulating valve 220, and pipe 292. Consequently, in the event the hand lever 268 is moved in a direction to effect an engagement of the ahead clutch 19 and there is interference between the jaws on the coacting clutch members 82, 83, it should be obvious that the shift bar 27 can only be moved the distance separating the opposed end surfaces of the interfering jaw members, that the continued movement of the hand lever 268 and the link 264 will cause the lever 266 to pivot about its point of connection with the link 267 and move the valve portions 278 and 279 to the right against the action of spring 282, and that the resulting valve movement will permit fluid under pressure to flow into the cylinders 196 and 197 of the jacking gear 51 to effect a slow step-by-step rotation of the turbine shaft 16 and of the axially movable clutch member 83 associated therewith.

The slow rotation of the clutch member 83 will bring the jaws or teeth thereon into alinement with the grooves or slots in the coacting clutch member 82 and as soon as this relation is established, the conjoint action of the hand lever 268 and spring 282 will move the shifting bar 27 and complete the clutch engaging movement of the member 83. This movement of the shifting bar 27 permits the spring 282 to return the valve 276 to the position shown thereby terminating the operation of the jacking gear 51. The check valves 289 prevent the fluid pressure supply line 56 from being connected to drain through the valve 276 which is associated with the clutch shifting mechanism that remains inoperative. Consequently, it is seen that whenever the hand lever 268 is actuated to effect an engagement of either the ahead clutch 19 or of the reverse clutch 24 and there is interference between the jaws or teeth on the coacting clutch members 82 and 83, the jacking gear which is operable to effect a slow rotation of one said clutch members is automatically rendered operative, and that as long as there is no such interference, the jacking gear remains inoperative.

The combined braking and rotation responsive devices 33 and 34 differ from those shown in Figs. 1 and 3 in that the piston 107 is not a valve structure and in that the interlocking devices which operate to prevent a movement of the clutch shifting bars 27 when the turbine and/or the locomotive are in motion, each comprises a collar 294 keyed to the piston stem 108 for rotation therewith and a radially extending arm 296 provided with a bifurcated outer end 297 which is arranged to coact with the link 264 and the three slots 298 formed therein. The arm 296 is provided with a biasing means 299 which may be constructed in the same manner as the similar means 113 shown in Fig. 3 and which is operative to permit a limited turning movement of the piston 107 and arm 296 in the event the coacting shaft is rotating when the braking surfaces 111 and 112 are brought into engagement and to thereafter return the parts to the position shown when the said surfaces are disengaged. The piston 107 in this modification is also provided with a second and oppositely disposed stem 301 having an enlarged end portion 302 which is engaged by the roller 303 mounted on the end of lever 304. The arrangement is such that when the piston is moved by the lever 304 to engage the braking surfaces 111, 112 and the shaft 8 is rotating, the biasing means 299 permits the piston 107 and the arm 296 to rotate a sufficient distance to place a bifurcated portion of the arm 296 in alinement with the link 264, thereby preventing a clutch shifting movement of the hand lever 268 and the links 264. If the coacting shafts are not rotating, the arms 296 remain in the positions shown with the bifurcated portions extending over and under the links 264, thereby permitting a clutch shifting movement of the links. The device 34 also functions in a similar manner in the event the drive shaft 7 is rotating. The use of three slots 298 in the links 264 is necessary because the lost motion connections between the links 264 and the levers 266 permit the links 264 to be moved to two different positions from the one which is shown.

The levers 304 for effecting a braking surface engaging movement of the pistons 107 of the combined braking and rotation responsive devices 33, 34, is supported intermediate its ends on a fixed pivot 305 and is actuated by means of a power operator 306 comprising a cylinder 307 having disposed therein a piston 308, a spring 309 urging the piston to the position shown, and a fluid inlet passage 311. The piston is provided with a stem 312 which is pivotally connected with each of the levers 304. The admission of fluid under pressure to the cylinder 307 moves the piston to the right thereby actuating levers 304 and the pistons 107 to engage the braking surfaces 111 and 112.

Referring more particularly to Fig. 2, which shows a locomotive having two driving units each embodying a prime mover and an associated gearing 6, it is seen that each of the gearings 6 is provided with the clutch shifting mechanism, the combined braking and rotation responsive device and the jacking gear control arrangement just described, and that only one hand lever 268 is necessary since the stem 312 of the power operator 306 is extended to connect with all of the levers 304, and since the levers 262 and 264 are connected for simultaneous parallel movement by means of the link 293. Consequently, a movement of the hand lever 268 to effect a clutch engaging movement either of the ahead clutch 19 or of the reverse clutch 24 associated with the turbine 1 simultaneously actuates the combined braking and rotation responsive devices associated with each of the units and simultaneously produces a similar movement of the corresponding clutch associated with the turbine 2. In this connection, however, it should be particularly noted that the axial spacing of the coacting clutch members 82 and 83 on the ahead and reverse clutches associated with the turbine 2 is greater than the axial spacing of the same parts of the ahead and reverse clutches associated with the turbine 1, and that therefore a clutch engaging movement of the hand lever 268 effects a sequential engagement either of all of the ahead clutches or of all of the reverse clutches associated with the said units. This feature is of particular importance in connection with the use of jaw type clutches and the operation of the jacking gears as it would be extremely difficult to, at all times, maintain the jaws and the coacting slots of the clutches of one driving unit in synchronism with respect to the jaws and the coacting slots of the corresponding clutches of the other unit which would be necessary in order to effect a simultaneous engagement either of both forward clutches or of both reverse clutches.

Referring again to Fig. 5, it is seen that the power operator 306 also operates a control valve 313 comprising a cylinder 314, spaced piston portions 316, 317, and a stem 318 which is connected with the power piston stem 312 by the lever 319. The cylinder 314 is provided with fluid passages 321, 322 and with a drain connection 323. The arrangement of the piston portions 316 and 317 is such that when the power piston 308 is in the position shown, fluid passages 321 and 322 are in communication with one another and that when the power piston moves and actuates the combined braking and rotation responsive devices 33 and 34, the passage 322, which is connected with the overspeed valve operator 46 by means of the pipe 324, is placed in communication with the drain connection 323.

The flow of fluid to the valve 313 is under the control of a valve 326 comprising a cylinder 327, spaced piston portions 328 and 329, and a stem 330 which is connected with the slidable collar 136 of the speed governor 36 by means of the lever 137. The cylinder 327 is provided with fluid passages 331 and 332 and with a drain connection 333. Passage 331 is connected with the passage 321 of valve 313 by the pipe 334 and the passage 332 is connected with the fluid supply pipe 56 by the pipe 336. During normal operation the valve 326 remains in the position shown and fluid under pressure flows through the pipe 336, valve 326, pipe 334, valve 313 and the pipe 324 to the overspeed valve operator 46 and maintains the overspeed valve 224 in its fully open position. However, in the event the turbine overspeeds, the governor 36 actuates the valve 326 to place the passage 321 in communication with the drain connection 333 which permits the fluid to drain from the overspeed valve operator 46 and the spring 227 to close the overspeed valve 224. The overspeed valve is also closed in a like manner whenever the power operator 306 actuates the valve 313 to place the passage 322 and the pipe 324 in communication with the drain connection 323.

Fluid under pressure is conducted to the power operator 306 through the main control valve 66 and the interconnecting pipe 337. In this modification, the biasing spring 241 is disposed within the valve cylinder 236 and the valve stem 239 is connected with a pivoted lever 338 provided at one end with a cam portion 339. The hand lever 268 is provided with an auxiliary or locking lever 341 which is pivotally mounted on the lever 268 with its handle portion disposed adjacent the handle portion of the lever 268 and which is connected with a bar 342 slidably mounted for vertical movement on the lever 268. The bar 342 is provided with a locking projection 343 adapted to coact with the spaced notches 344 in the fixed quadrant 345 and with a roller 346 which engages the cam portion 339 of the lever 338. The arrangement is such that when the handle portion of the lever 341 is moved toward the handle portion of the lever 268, which can be accomplished by the operator grasping the handle portions of both levers in one hand, the lock bar 342 moves downward thereby withdrawing the locking projection 343 from the oppositely disposed notch 344 in the quadrant 345 and moving the lever 338 and the valve 66 downward from the position shown. The downward movement of the valve 66, places the pipe 337, which was in communication with the drain connection 244, in communication with the fluid supply pipe 56 which permits fluid under pressure to flow into the cylinder of the power operator 306.

The hand lever 268 is also provided with an integral quadrant 347 having spaced notches corresponding in number and arrangement to the notches in the fixed quadrant 345. A rod 348, which is provided with a locking projection 349 coacting with the slot 72 in the throttle rod 48 and which is operatively connected with the stem 312 of the power operator 306 to be moved thereby by means of the bell crank 351, is operatively connected with a locking bell crank lever 352 which is arranged to have the end of one arm enter the oppositely disposed notch in the quadrant 347. A rod 353 has one end connected with the quadrant 347 so as to be actuated by movement of the lever 268 and its other end is provided with a locking projection 354 which coacts with the slot 234 in the throttle rod 48. The throttle rod slots 72 and 234 coact with the rods 348 and 353, respectively, so that when the power operator 306 is actuated to effect a clutch engaging movement of the links 264, the projection 349 on the rod 348 locks the throttle rod 48 against movement and so that when the lever 268 is moved to its ahead or reverse position, the projection 354 on the rod 353 is shifted to permit an actuation of the rod 48.

Assuming the parts are in the position shown in Fig. 5, the movement of the handle portion of lever 341 toward the handle portion of the lever 268 disengages the locking projection 343 from the quadrant 345 and actuates the valve 66 to admit fluid under pressure to the operator 306 which in turn moves the surfaces 112 on the combined braking and rotation responsive devices 33 and 34 into engagement with the coacting surfaces 111 on the shafts 8 and 7, respectively. The power operator 306 also moves the rod 348 to lock the throttle rod 48 against movement and to withdraw the locking lever 352 from engagement with the quadrant 347 on the hand lever 268. Consequently, if none of the shafts 7 and 8 is turning, the lever 268 may be moved from the position shown to effect an engagement with either of the forward or of the reverse clutches as desired. The lever 341 can now be released since the locking projection 343 on the rod 342 is disposed opposite a slot 344 in the fixed quadrant 346. The release of lever 341 effects a return of the valve 66 and of the power operator 306 to the positions shown whereupon the lever 268 is locked in its shifted position by the said projection 343 and by the locking bell crank lever 352. The throttle lever 47 may now be moved to open the throttle valve 223 and since the overspeed valve 224 is held open by fluid pressure in pipe 324, the locomotive will be driven in the desired direction.

However, if any one of the shafts 7 and 8 was turning, when the handle portion of lever 341 was moved toward the bar 268, a locking arm 296 would have been shifted as previously described to prevent a movement of the hand lever 268 and the mechanism associated therewith. If this were the case, the operator after the elapse of a few seconds which should be sufficient for the braking devices 33 and 34 to bring the locomotive and/or the turbines to a complete stop, would then release the lever 341 which would effect a return of the various parts to their initial positions. The lever 341 could then be immediately moved towards the handle portion of lever 268 which would permit the sequential operation of the various parts as briefly set forth in the preceding paragraph.

This modified system in addition to providing all of the safety features and advantages afforded by the system illustrated in Figs. 1 and 3 also effects a sequential engagement of the corresponding clutches in a multiple power unit drive and the operation of the jacking gear associated with each power unit only in the event there is actual interference between the coacting clutch members of that particular unit.

Referring particularly to Figs. 6, 7 and 8, which shows a practical correlation of the gearing 6 and the mechanically actuated control devices schematically illustrated in Figs. 2 and 5, it is seen that the gearing is completely enclosed in a housing comprising a main bearing supporting portion 357 and top and bottom cover members 358 and 359, respectively, which are removably secured to the main portion 357 by any suitable means such as the bolts shown in Fig. 7. The main portion 357 is provided with a plurality of spaced transverse bearing supporting webs 361 and a pair of laterally and oppositely extending supporting brackets 362. The top portions of the webs 361 mount the two laterally spaced series of bearings 12 and 80 which rotatably support the lay shafts 8 and 9 and the concentric sleeves 81, respectively. The turbine shaft bearings 21 are each carried by a support 363 which is in turn carried by the top portion of the underlying bearing supporting web 361. The drive shaft 7 is supported in spaced bearings 364 which are disposed on opposite sides of the pair of gears 18 and which are carried by the bottom portion of two adjacent webs 361. The clutch shifting bars 27 are disposed on opposite sides of the housing and extend through alined guide openings 366 in the lower part of two adjacent webs 361. The valve structure and biasing means 276 which is operatively associated with the adjustable fulcrum 273 of lever 266 is supported by a bracket means 367 secured to the adjacent side wall of the bottom cover member 359. The links 264 are each slidably supported by a bearing 368 formed in the end wall of the bottom cover member 359. The pivot 305 for the lever 304 is mounted on the corresponding end wall of the main portion 357 as is also the valve structure 326 which is actuated by the speed governor 36. The combined braking and rotation responsive devices 33 and 34 are each supported on the adjacent webs 361 by means of a bracket 369 which may be made integral with the cylinders 106. The stem 312 of the power operator 306 passes through alined openings 370 disposed in an end wall of the main portion 357 and in the bottom part of the adjacent web 361. The jacking gear mechanism 51 is supported on the exterior surface of the top cover member 358 directly above the jacking gear 203 which is disposed on the end of the shaft 16 that is remote from the turbine.

Figure 9:
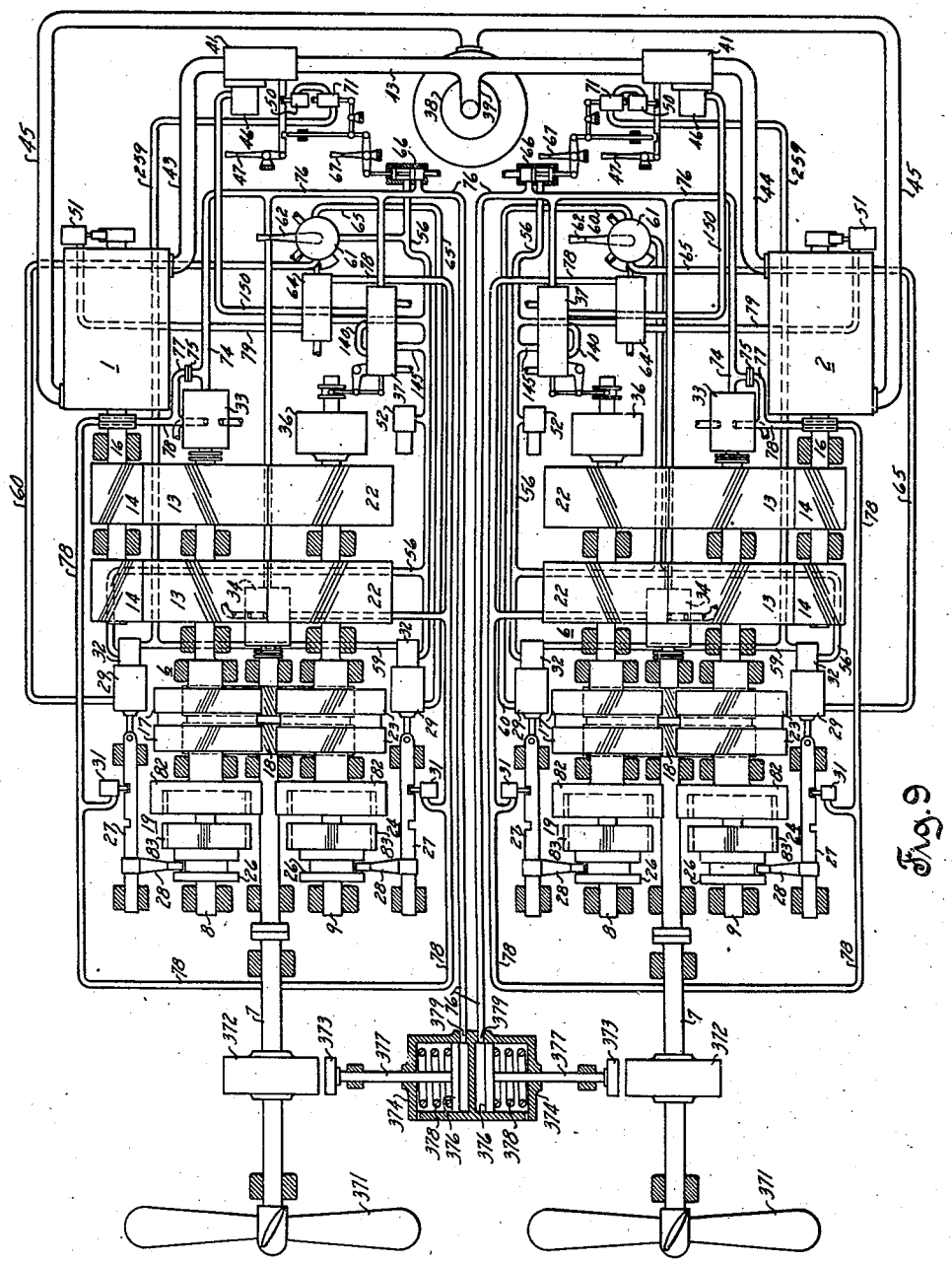
Fig. 9 illustrates a further modification of the control system shown in Figs. 1 and 3.

Fig. 9 shows a marine drive arrangement comprising twin screws 371 each being driven by a separate turbine through the gearing 6 as described in connection with Figs. 1 to 5, inclusive. The control of this arrangement differs from that previously described, particular reference being had to Figs. 1 and 3, in that each turbine and the associated gearing is provided with the complete control system illustrated in Fig. 3 whereby each turbine and the driving mechanism associated therewith may be independently operated and controlled at any time. Consequently, the relative speeds of the two driving units may be varied as desired and one unit may be operated to propel the vessel in one direction while the other unit is either maintained idle or operated to propel the vessel in the opposite direction. Like numerals are used to designate similar parts and since the operation and the control of the separate driving units is identical, with the exception of one feature, to that described in connection with Fig. 3, a further detailed description in this respect is deemed unnecessary.

The aforementioned exception resides in the construction of the devices 34 to function only as rotation responsive devices and in the provision of a positive braking means which is operatively associated with each drive shaft 7 and which is rendered operative by the movement of the hand lever 67 and valve 66. The positive braking means comprises a brake drum 372 secured to each of the drive shafts 7, a coacting brake shoe 373, and a power operator for each of the brake shoes 373 comprising a cylinder 374, a piston 376 having a stem 377 connected with the brake shoe 373, a spring 378 arranged to urge the piston 376 and the brake shoe 373 to the position shown, and a fluid inlet passage 379 whereby the admission of fluid under pressure into the cylinder 374 causes the piston to move and forcibly engage the brake shoe 373 with the brake drum 372. The inlet passage 379 is connected with the source of fluid under pressure 52 by means including the pipe 76, the valve 66 and the pipe 56 and the arrangement is such that the step of moving the hand lever 67 either to the right or to the left from the position shown, which step must be performed before the lever 62 can be actuated to effect a clutch engaging movement of the shift bars 27, admits fluid under pressure to the cylinder 374 and causes the piston 376 to forcibly engage the brake shoe 373 with the brake drum 372 on the drive shaft 7 thereby either preventing or stopping the rotation of the drive shaft which is to be clutched to the turbine by the movement of the lever 62. The device 33 is constructed to function as a combined braking and rotation responsive device in the manner and for the purpose previously described in connection with Figs. 1 to 5, inclusive.

It should therefore be obvious that the modification shown in Fig. 9 in addition to providing all of the safety features and advantages afforded by the system illustrated in Figs. 1 and 3, also permits the individual driving units to be separately operated and controlled in any desired manner which improves the flexibility of the driving mechanism and permits a rapid maneuvering of the vessel under the most adverse conditions. Moreover, while the modification shown in Fig. 9 is particularly applicable for the propulsion of water vehicles, it should also be obvious that certain of the features can be advantageously employed in connection with the propulsion of land vehicles.

The invention contemplates a control system for power driven vehicles having one or more driving units each including positive forward and reverse clutches in which the control system is correlated with the vehicle and with one or more of the driving units so as to effect a mode of control embodying one or more of the following features:

(1) That the first step which is necessary in the manipulation of the control system to effect a clutch engaging movement operates braking mechanism which may include the usual braking system employed on vehicles to stop the movement of the vehicle and/or the rotation of the vehicle drive shaft and to stop the operation of the prime mover;

(2) That the said first step actuates mechanism operative to terminate the development of power by the prime mover;

(3) That an operating movement of a driving unit and/or movement of the vehicle prevents an actuation of the clutch shifting means;

(4) That when the forward and reverse clutches are disengaged, the means controlling the development of power by the prime mover is maintained in its inoperative position;

(5) That the manipulation of the clutch shifting mechanism effects a slow rotation of one of the coacting clutch members to facilitate clutch engagement;

(6) That the manipulation of the clutch shifting mechanism effects a sequential engagement of the corresponding clutches of a multiple drive unit;

(7) That the jacking gear mechanism is rendered operative only in the event there is actual interference between those coacting clutch members with which the jacking gear mechanism is associated; and (8) That when a prime mover is operating to propel the vehicle in either the forward or the reverse direction, the control system is rendered inoperative to actuate the clutch shifting mechanism which is associated with the operating prime mover.

It should therefore be understood that although the invention is shown and described in connection with the control and operation of power plants for driving locomotives and water vehicles, the invention is applicable to all types of vehicles and that it is not desired to limit the invention to the particular modes of operation and details of construction herein shown and described as various modifications within the scope of the appended claims may occur to persons skilled in the art.

It is claimed and desired to secure by Letters Patent:

1. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, and means controlling the actuation of said shifting means and operatively associated with each of said prime movers so that an operating movement of any one of said prime movers prevents an actuation of the said shifting means.

2. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, and means controlling the actuation of said shifting means and operatively associated with said vehicle so that either a forward or a rearward movement of the vehicle prevents an actuation of the said shifting means.

3. In combination with a vehicle having a plurality of prime movers each connected with a driving element through power transmitting mechanism including forward and reverse clutches for propelling the vehicle in either direction, means controlling the operations of the prime movers, clutch shifting means operable to engage either all of the forward clutches or all of the reverse clutches to render the prime movers operable simultaneously to effect either a forward or a rearward movement of the vehicle, and means controlling the actuation of said means controlling the operations of the prime movers and the actuation of said shifting means and operatively associated with each of said prime movers so that when the said means controlling the operations of the prime movers is positioned to terminate prime mover operation and the said clutch shifting means is in a neutral position an operating movement of any one of said prime movers prevents an actuation of the said prime mover control means and an actuation of the said shifting means.

4. In combination with a vehicle having a plurality of prime movers each connected with a driving element through power transmitting mechanism including forward and reverse clutches for propelling the vehicle in either direction, means controlling the operation of the prime movers, clutch shifting means operable to engage either all of the forward clutches or all of the reverse clutches to render the prime movers operable simultaneously to effect either a forward or a rearward movement of the vehicle, and means controlling the actuation of said means controlling the operation of the prime movers and the actuation of the said shifting means and operatively associated with said vehicle so that when the said prime mover control means is positioned to terminate prime mover operation and the said clutch shifting means is in a neutral position either a forward or a rearward movement of the vehicle prevents an actuation of the said means controlling the operation of the prime movers and an actuation of the said shifting means.

5. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, means controlling operation of the prime movers, and interlocking means controlling the actuation of said shifting means and operatively associated with said means controlling operation of the prime movers so as to render the said clutch shifting means inoperable whenever the said means controlling operation of the prime movers is positioned to effect an operation thereof.

6. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, first means controlling operation of the prime movers, interlocking means controlling the actuation of said shifting means, second means also controlling operation of the prime movers which is normally positioned to permit operation thereof and which is disposed in dominating relation with respect to said first means, and means operatively associated with said interlocking and second means to effect a movement of said second means to a position preventing operation of said prime movers whenever said interlocking means is actuated to effect a release of the said clutch shifting means.

7. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, first means controlling operation of the prime movers, interlocking means controlling the actuation of said shifting means and operatively associated with said first means so as to render the said clutch shifting means inoperable whenever the said first means is positioned to effect an operation of the prime movers, second means also controlling operation of the prime movers which is normally positioned to permit operation thereof and which is disposed in dominating relation with respect to said first means, and means operatively associated with said interlocking and second means to effect a movement of said second means to a position preventing operation of said prime movers whenever said interlocking means is actuated to effect a release of the said clutch shifting means.

8. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, a motion responsive device arranged for operative connection with each of said prime movers, and control means operatively associated with said shifting means and with each of said motion responsive devices so that the establishment of an operative connection between each prime mover and its motion responsive device is necessary to permit an actuation of the said shifting means and so that an operating movement of any one of said prime movers also prevents an actuation of said shifting means.

9. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, first means controlling the operation of the prime movers, a motion responsive device arranged for operative connection with each of said prime movers, and control means operatively associated with said shifting and first means and with each of said motion responsive devices so that a movement of said first means to a position terminating operation of the prime movers and the establishment of an operative connection between each prime mover and its motion responsive device is necessary to permit an actuation of said shifting means and so that an operating movement of any one of said prime movers also prevents an actuation of said shifting means.

10. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, first means controlling the operation of the prime movers, a motion responsive device arranged for operative connection with each of said prime movers, control means operatively associated with said shifting and first means and with each of said motion responsive devices so that a movement of said first means to a position terminating operation of the prime movers and the establishment of an operative connection between each prime mover and its motion responsive device is necessary to permit an actuation of said shifting means and so that an operating movement of any one of said prime movers also prevents an actuation of the said shifting means, second means also controlling operation of the prime movers which is normally in a position to prevent the operation thereof and which is disposed in dominating relation with respect to said first means, and means operatively associated with said control and second means to effect a movement of said second means to a position terminating operation of the prime movers whenever said control means is actuated to effect an operative connection between each prime mover and its motion responsive device.

11. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, a motion responsive device arranged for operative connection with a moving part of each prime mover, an additional motion responsive device arranged for operative connection with a part which moves only when the vehicle is in motion, locking means operatively associated with said clutch shifting means and with said motion responsive devices so that a movement of any one of said devices in response to a movement of the part with which it is connected operates to prevent an actuation of said clutch shifting means, and means operatively associated with said devices to effect an operative connection between each of said devices and parts and with said shifting means to prevent an actuation of said shifting means prior to the establishment of an operative connection between said devices and parts.

12. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, first means controlling operation of the prime movers, a motion responsive device arranged for operative connection with a moving part of each prime mover, an additional motion responsive device arranged for operative connection with a part which moves only when the vehicle is in motion, locking means operatively associated with said clutch shifting means and with said motion responsive devices so that a movement of any one of said devices in response to a movement of the part with which it is connected operates to prevent actuation of said clutch shifting means, and means operatively associated with said devices to effect an operative connection between each of said devices and parts and with said shifting and first means to prevent the establishment of an operative connection between said devices and parts, and an actuation of said shifting means when said first means is positioned to effect an operation of the prime movers.

13. In combination with a vehicle having a prime mover connected with a driving element through power transmitting mechanism including positive forward and reverse clutch members, clutch shifting means operable to selectively engage either the forward or the reverse clutch members for propelling the vehicle in either direction, means operative to effect a slow rotation of the prime mover to facilitate clutch engagement, and means controlling the operation of said slow operating means and operatively connected with said clutch shifting means so that the said slow operating means is rendered operative by an actuation of the said clutch shifting means only in the event there is actual interference between the clutch members which are to be engaged.

14. In combination with a vehicle having a plurality of prime movers each connected with a driving element through power transmitting mechanism including positive forward and reverse clutch members for propelling the vehicle in either direction, clutch shifting means operable to sequentially engage either all of the forward clutch members or all of the reverse clutch members to render the prime movers operable simultaneously to effect either a forward or a rearward movement of the vehicle, means operative to effect a slow operation of each of said prime movers to facilitate clutch engagement, and means controlling the operation of each of said slow operating means and operatively connected with said clutch shifting means so that said slow operating means is rendered operative by an actuation of the said clutch shifting means only in the event there is actual interference between those clutch members with which the slow operating means is associated.

15. In combination with a vehicle having a plurality of prime movers each connected with a driving element through power transmitting mechanism including forward and reverse clutches for propelling the vehicle in either direction, clutch shifting means operable to engage either all of the forward clutches or all of the reverse clutches to render the prime movers operable simultaneously to effect either a forward or a rearward movement of the vehicle, means operative to effect a slow operation of each of said prime movers to facilitate clutch engagement, and means controlling operation of said slow operating means and operatively connected with said clutch shifting means so that said slow operating means is rendered operative by an actuation of the clutch shifting means.

16. In combination with a vehicle having a plurality of prime movers each connected with a driving element through power transmitting mechanism including positive forward and reverse clutches for propelling the vehicle in either direction, clutch shifting means operable to sequentially engage either all of the forward clutches or all of the reverse clutches to render said prime movers operable to effect either a forward or a rearward movement of the vehicle, and means controlling the operation of said prime movers and operatively associated with said shifting means so as to maintain said prime mover control means inoperative until the said sequential clutch engagement has been effected.

17. In combination with a vehicle having a prime mover and power transmitting mechanism including forward and reverse clutches, clutch shifting means operable to selectively connect said prime mover and power transmitting mechanism for propelling the vehicle in either direction, means controlling the actuation of said clutch shifting means and operatively associated with said prime mover so that an operating movement of said prime mover prevents an actuation of said shifting means, means controlling the development of power by the prime mover, and means operatively connecting said clutch shifting means and said means controlling power development so that an actuation of the said clutch shifting control means operates the said means controlling power development to terminate the development of power by the said prime mover.

18. In combination with a vehicle having a prime mover, power transmitting mechanism including forward and reverse clutches, clutch shifting means operable to selectively connect said prime mover and power transmitting mechanism for propelling the vehicle in either direction, means controlling the actuation of said clutch shifting means, and means including braking and motion responsive mechanism operatively associated with said vehicle and with said means controlling the actuation of said clutch shifting means so that either a forward or a rearward movement of said vehicle prevents an actuation of the said clutch shifting means and so that the actuation of the said means controlling the actuation of said clutch shifting means effects a braking action operative to terminate either a forward or a rearward movement of the vehicle.

19. In combination with a vehicle having a prime mover, power transmitting mechanism including forward and reverse clutches, clutch shifting means operable to selectively connect said prime mover and power transmitting mechanism for propelling the vehicle in either direction, means controlling the actuation of said clutch shifting means, and means including braking and motion responsive mechanism operatively associated with said prime mover and with said means controlling the actuation of said clutch shifting means so that an operating movement of the prime mover prevents an actuation of the said clutch shifting means and so that the actuation of the said means controlling the actuation of said clutch shifting means effects a braking action operative to terminate movement of the prime mover.

20. In combination with a vehicle having a plurality of prime movers, a drive shaft for each prime mover, power transmitting mechanism including forward and reverse clutches, clutch shifting means operable to selectively connect each prime mover with its associated drive shaft for rotating the said drive shaft in opposite directions, separate means controlling the actuation of each said clutch shifting means and operatively associated with the said drive shaft so that a rotation of the said drive shaft prevents an actuation of the said clutch shifting means, braking mechanism operatively associated with each of said drive shafts, and means operatively connecting the means controlling the actuation of each of said clutch shifting means and the braking mechanism associated with each drive shaft so that an actuation of the said means controlling the actuation of each of said clutch shifting means operates the said braking mechanism to terminate rotation of the said shaft.

21. In combination with a power driven device having a prime mover connected with a driving element through power transmitting mechanism including a clutch, clutch shifting means, means controlling the actuation of said clutch shifting means and operatively associated with said prime mover so that an operating movement of said prime mover prevents an actuation of the said clutch shifting means.

22. In combination with a power driven vehicle having a prime mover connected with a driving element through power transmitting mechanism including a clutch, clutch shifting means, means controlling the actuation of said clutch shifting means and operatively associated with said vehicle so that either a forward or a rearward movement of the vehicle prevents an actuation of the said clutch shifting means.

23. In combination with a power driven device having a prime mover connected with a driving element through power transmitting mechanism including a clutch, clutch shifting means, means operative to effect a slow operation of said prime mover, and means controlling operation of said slow operating means and operatively connected with said clutch shifting means so that said slow operating means is rendered operative by a clutch engaging movement of said clutch shifting means.

24. In combination with a power driven device having a prime mover and power transmitting mechanism including a clutch, clutch shifting means, operable to selectively establish a driving connection between said prime mover and device, means controlling actuation of said clutch shifting means and operatively connected with said prime mover so that an operating movement of said prime mover prevents an actuation of the said clutch shifting means, means controlling the development of power by said prime mover, and means operatively connecting said clutch shifting means and said means controlling power development so that an actuation of the said clutch shifting control means operates said means controlling power development to terminate the development of power by said prime mover.

25. In combination with a power driven device having a prime mover connected with a driving element through power transmitting mechanism including a clutch, clutch shifting means, braking mechanism operatively associated with said prime mover, and means operatively connecting said braking mechanism with said clutch shifting means so that a clutch engaging movement of said clutch shifting means actuates said braking mechanism to terminate the operating movement of the prime mover.

ROBERT C. ALLEN.
CLARENCE E. KENNEY.